United States Patent
Corsetti et al.

(10) Patent No.: US 9,546,703 B2
(45) Date of Patent: Jan. 17, 2017

(54) TRANSMISSION BRAKE AND TORQUE LIMITING SYSTEM

(71) Applicant: GM GLOBAL TECHNOLOGY OPERATIONS LLC, Detroit, MI (US)

(72) Inventors: Anthony J. Corsetti, Rochester Hills, MI (US); Jean Marie Miller, Plymouth, MI (US); Goro Tamai, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 117 days.

(21) Appl. No.: 14/454,255

(22) Filed: Aug. 7, 2014

(65) Prior Publication Data
US 2015/0260248 A1 Sep. 17, 2015

Related U.S. Application Data

(60) Provisional application No. 61/953,099, filed on Mar. 14, 2014.

(51) Int. Cl.
*B60W 10/18* (2012.01)
*F16D 67/02* (2006.01)
*F16D 43/202* (2006.01)

(52) U.S. Cl.
CPC ........... *F16D 67/02* (2013.01); *F16D 43/2028* (2013.01)

(58) Field of Classification Search
CPC ............................. F16D 67/02; F16D 43/2028
See application file for complete search history.

(56) References Cited

U.S. PATENT DOCUMENTS

| | | | | |
|---|---|---|---|---|
| 3,031,052 A * | 4/1962 | Blinder | ............... | F16D 41/067 192/45.008 |
| 3,031,053 A * | 4/1962 | Sauzedde | ............ | F16D 41/067 119/57.7 |
| 5,667,046 A * | 9/1997 | Stanton | ............... | F16D 41/067 188/82.84 |
| 6,338,402 B1 * | 1/2002 | Muramatsu | ......... | F16D 41/067 192/45.011 |
| 6,568,516 B2 * | 5/2003 | Kemp, III | ............. | F16D 41/08 192/45.008 |
| 6,712,188 B2 * | 3/2004 | Ando | .................. | F16D 41/067 192/45.011 |
| 7,441,642 B2 * | 10/2008 | Calmelat | ............. | F16D 41/088 192/45.006 |
| 7,849,989 B2 * | 12/2010 | Ogata | ................. | F16D 41/066 192/113.32 |
| 2002/0195306 A1 * | 12/2002 | Ando | .................. | F16D 41/067 192/45.015 |
| 2009/0194381 A1 * | 8/2009 | Samie | ................. | B60K 6/383 192/43.2 |

* cited by examiner

*Primary Examiner* — David J Hlavka
(74) *Attorney, Agent, or Firm* — Quinn Law Group

(57) ABSTRACT

A vehicle includes a transmission, which is characterized by the absence of a friction clutch that is operable to limit torque transfer between the drive wheels and a shaft of the transmission, to prevent torque communication between the drive wheel and the shaft. The transmission includes a selectable one way clutch, which interconnects a housing of the transmission and the shaft. The selectable one way clutch is selectively operable to prevent rotation of the shaft in at least one rotational direction. The selectable one way clutch includes a torque limiting system, such as a ball-detent torque limiting mechanism, which is operable to prevent torque transfer greater than a pre-defined value, between the housing and the shaft.

12 Claims, 4 Drawing Sheets

TRANSMISSION BRAKE AND TORQUE LIMITING SYSTEM

CROSS-REFERENCE TO RELATED APPLICATIONS

This application claims the benefit of U.S. Provisional Patent Application Ser. No. 61/953,099, filed on Mar. 14, 2014, the disclosure of which is hereby incorporated by reference.

TECHNICAL FIELD

The disclosure is generally related to a transmission for a vehicle.

BACKGROUND

Vehicles include an engine for producing a drive torque. A transmission is attached to the engine, and typically includes an input shaft that receives the drive torque from a crank shaft of the engine. The input shaft is coupled to an output shaft of the transmission through a gear train. The output shaft is coupled to and transfers the drive torque to a driveline, which includes one or more drive wheels, to drive the vehicle.

The transmission may include several different operating modes, such as but not limited to a forward drive mode and a rearward drive mode. The transmission may or may not include a neutral drive mode, which de-couples or disconnects the drive wheels from the input shaft. The neutral mode prevents torque from being transmitted between the engine and the drive wheels when the transmission is disposed in the neutral mode. However, if the transmission is not configured to include a neutral mode, then the engine and the drive wheels are constantly disposed in torque communication. When the transmission is configured without a neutral mode, then any torque spikes introduced into the system, such as at the drive wheels, are communicated through the transmission, and the components of the transmission must be designed to handle these possible torque spikes.

SUMMARY

A transmission for a vehicle is provided. The transmission includes a housing, and a shaft that is rotatably supported by the housing. The shaft is supported for rotation about an axis, and is operable to receive a torque from an engine. A selectable one way clutch interconnects the housing and the shaft. The selectable one way clutch is selectively operable to prevent rotation of the shaft about the axis in at least one rotational direction.

A vehicle is also provided. The vehicle includes an engine, which includes a crank shaft that is operable to output a torque. A transmission is coupled to the engine, and includes a housing that rotatably supports a shaft. The shaft is coupled to the crankshaft of the engine for receiving the torque from the engine. The transmission includes a selectable one way clutch, which interconnects the housing and the shaft. The selectable one way clutch is selectively operable to prevent rotation of the shaft in at least one rotational direction. The selectable one way clutch includes a ball-detent torque limiting mechanism, which is operable to prevent torque transfer greater than a pre-defined value, between the housing and the shaft. A drive wheel is coupled to the transmission in torque communication therebetween.

The transmission is characterized by the absence of a friction clutch operable to limit torque communication between the drive wheel and the shaft of the transmission.

Accordingly, in response to a torque that is greater than the pre-defined value being introduced into the driveline, such as through the drive wheel, the torque limiting system, such as the ball-detent torque limiting mechanism, operates to prevent torque transfer from the drive wheel through the transmission, thereby preventing damage to the components of the transmission. Additionally, because the torque limiting system prevents torque that is greater than the pre-defined value from being introduced to the shaft, the components of the transmission do not have to be sized to handle a torque that is larger than the pre-defined value, thereby reducing the size and cost of the components of the transmission.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
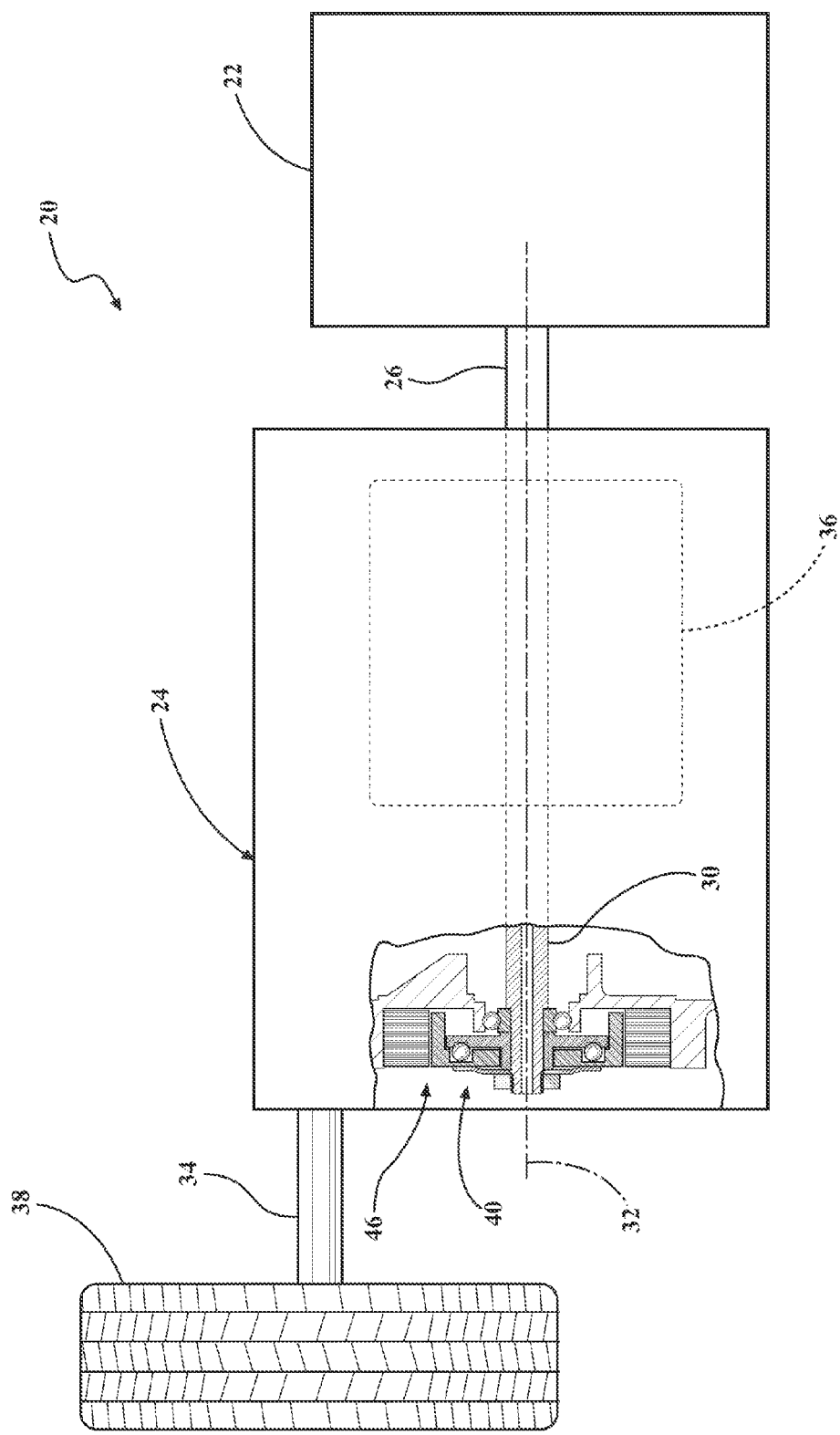
FIG. 1 is a schematic diagram of a vehicle showing a partially cross sectioned transmission.

Referring to the Figures, wherein like numerals indicate like parts throughout the several views, a vehicle is schematically shown at 20 in FIG. 1. Referring to FIG. 1, the vehicle 20 includes an engine 22 coupled to a transmission 24. The engine 22 may include, but is not limited to, an internal combustion engine such as a gasoline or a diesel engine. The engine 22 includes a crank shaft 26, which is operable to output a drive torque. The transmission 24 includes a housing 28, which rotatably supports a shaft for rotation about an axis. The shaft may include an input shaft 30, an output shaft 34, or an intermediate shaft (not shown). The written description below refers to the shaft as the input shaft 30. However, the scope of the claims should not be limited to the exemplary embodiment of the input shaft 30. The input shaft 30 is rotatable about an input axis 32. The input shaft 30 is coupled to the crankshaft for receiving the drive torque from the engine 22. The transmission 24 transfers the drive torque from the input shaft 30 to an output shaft 34 via a gear train 36. At least one drive wheel 38 is coupled to the output shaft 34 of the transmission 24 in torque communication therebetween. The transmission 24 transfers the drive torque to the drive wheel 38 through the output shaft 34.

The transmission 24 may include a forward drive mode and a rearward drive mode. Alternatively, if the transmission 24 is configured for an electric vehicle that is powered by an electric motor, the transmission 24 may only include a single drive mode, with the electric motor operating in a first direction to propel the vehicle forward, and the electric motor operating in a second direction to propel the vehicle rearward. The transmission 24 may or may not include a neutral mode. Accordingly, the transmission 24 may not include a true mechanical neutral for de-coupling the drive wheels 38 from the input shaft 30 of the transmission 24, to prevent torque communication between the drive wheel 38 and the input shaft 30 of the transmission 24. Furthermore, the transmission 24 does not include a friction clutch that is operable to limit torque transfer between the drive wheel 38 and the input shaft 30. Because the transmission 24 may not include a neutral mode, and does not include a friction clutch that may be slipped to limit torque transfer between the drive wheels 38 and the input shaft 30 of the transmission 24, the transmission 24 includes a torque limiting system 40, described in greater detail below, to limit torque transfer between the drive wheels 38 and the input shaft 30 of the transmission 24 to below a pre-defined torque value, thereby protecting the input shaft 30 of the transmission 24 from torque spikes, such as may occur when spinning drive wheels 38 suddenly contact dry pavement and introduce a torque spike into the drive system.

Figure 2:
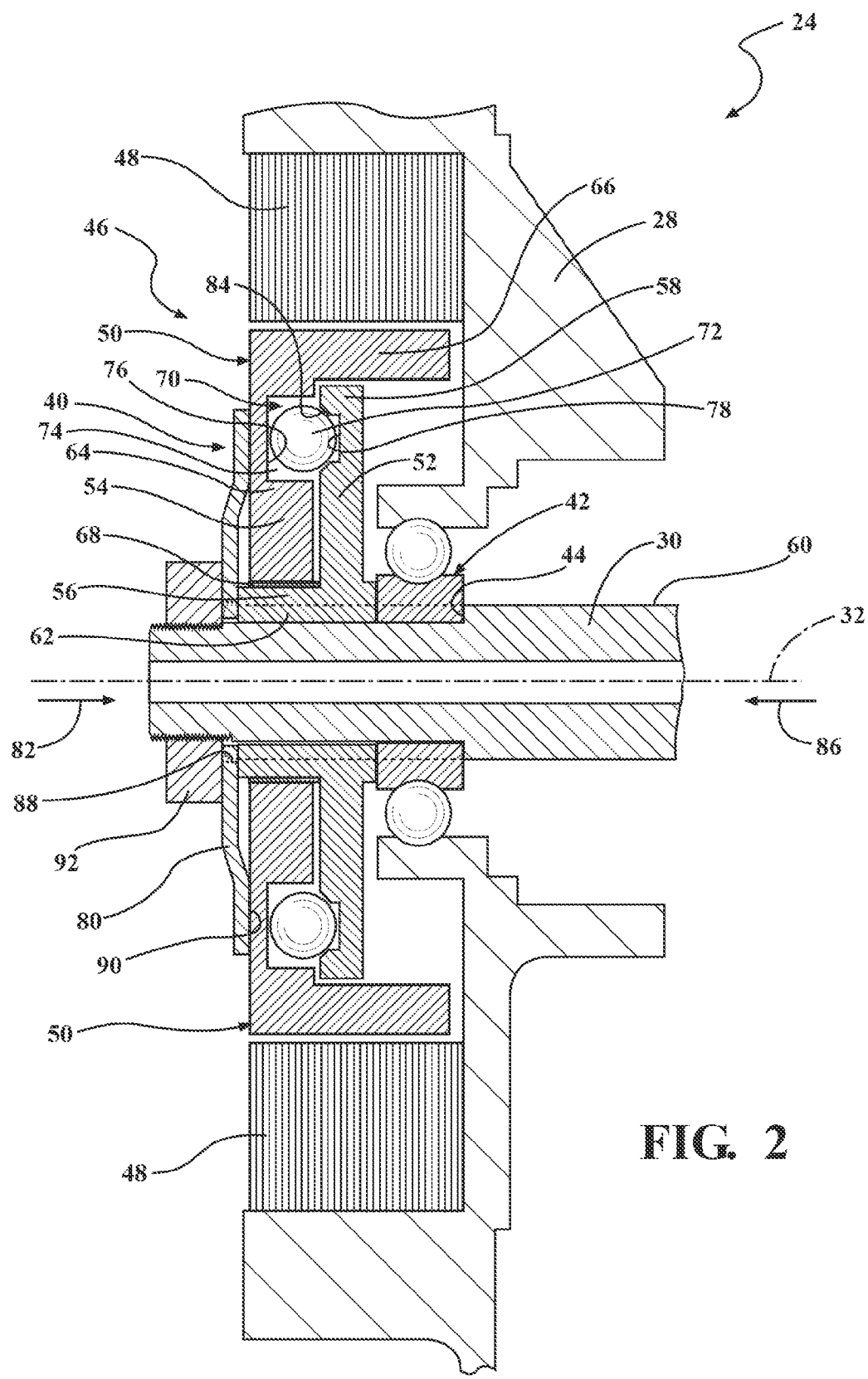
FIG. 2 is an enlarged schematic fragmentary cross sectional view of the transmission showing a selectable one way clutch including a torque limiting system.
Figure 4:
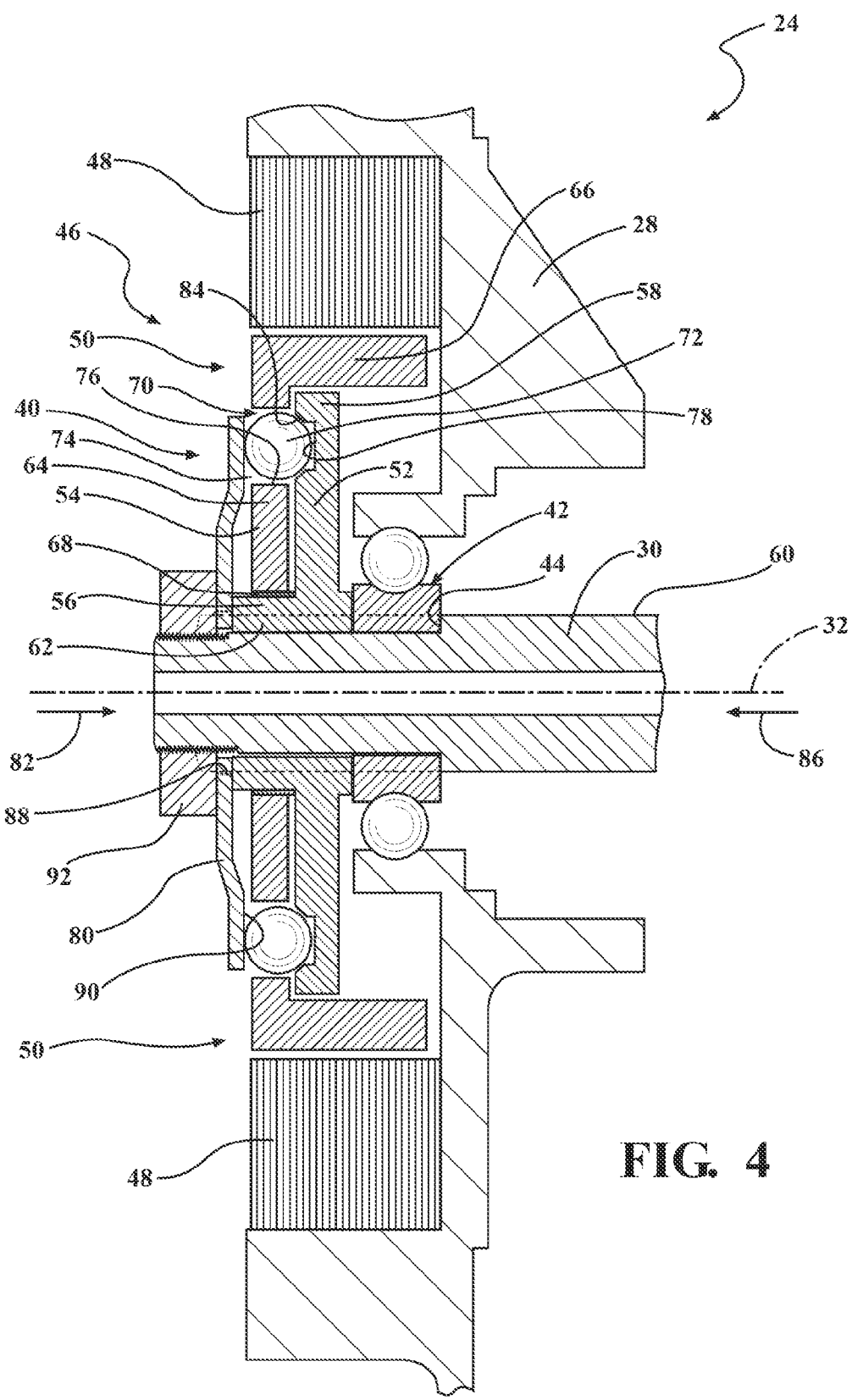
FIG. 4 is an enlarged schematic fragmentary cross sectional view of the transmission showing the selectable one way clutch including an alternative embodiment of the torque limiting system.

Referring to FIGS. 2 and 4, the input shaft 30 is rotatably supported relative to the housing 28 of the transmission 24 by a bearing 42. The bearing 42 is seated against a shoulder 44 that is defined by the input shaft 30. The transmission 24 includes a selectable one way clutch 46, which interconnects the housing 28 and the input shaft 30. It should be appreciated that if the shaft of the transmission 24 is defined as the output shaft 34 or the intermediate shaft, then the selectable one way clutch 46 would interconnect the housing 28 and the output shaft 34 or the intermediate shaft respectively. The selectable one way clutch 46 is selectively operable to prevent rotation of the input shaft 30 about the input axis 32 in at least one rotational direction. The selectable one way clutch 46 may include any device that is capable of selective engagement to control or limit rotation of the input shaft 30 in one or both rotational directions about the input axis 32.

The selectable one way clutch 46 includes a fixed portion 48 that is fixedly attached to the housing 28, and a rotatable portion 50 that is attached to the input shaft 30 for rotation with the input shaft 30 about the input axis 32. The rotatable portion 50 and the fixed portion 48 are controlled to selectively engage and/or disengage the selectable one way clutch 46. When the selectable one way clutch 46 is engaged, the rotatable portion 50 interacts with the fixed portion 48 in a manner that limits or prevents rotation of the input axis 32 in at least one direction. When the selectable one way clutch 46 is disengaged, the rotatable portion 50 does not interact with the fixed portion 48, thereby allowing the rotatable portion 50 to rotate with the input shaft 30 about the input axis 32. The selectable one way clutch 46 may be controlled to limit rotation of the input shaft 30 in either a clockwise direction, a counter-clockwise direction, or both the clockwise and counterclockwise directions, either individually or simultaneously. The specific operation or manner in which rotatable portion 50 and the fixed portion 48 are engaged and/or disengaged to prevent or limit rotation of the input shaft 30 is known to those skilled in the art, and is not pertinent to the description of the invention. As such, the specific operation and/or control between the rotatable portion 50 and the fixed portion 48 of the selectable one way clutch 46 is not described in detail herein.

The rotatable portion 50 of the selectable one way clutch 46 includes an inner member 52 and an outer member 54. The inner member 52 is mounted to the input shaft 30, and is rotatably fixed to the input shaft 30 for rotation with the input shaft 30 about the input axis 32. As shown, the inner member 52 includes a barrel portion 56 and an annular plate portion 58. The barrel portion 56 extends along the input axis 32, and is disposed annularly about an outer radial surface 60 of the input shaft 30. Preferably, the barrel portion 56 is connected to the input shaft 30 for rotation together via a splined connection 62 interconnecting the barrel portion 56 of the inner member 52 and the input shaft 30. The annular plate portion 58 of the inner member 52 extends radially outward from the barrel portion 56 a radial distance to a distal circumferential edge.

The outer member 54 is rotatably supported by the inner member 52. The outer member 54 is rotatable about the input axis 32 relative to the input shaft 30 and the inner member 52. The outer member 54 includes an annular plate portion 64, which is supported by the barrel portion 56 of the inner member 52, and is disposed opposite the annular plate portion 58 of the inner member 52. The annular plate portion 64 of the outer member 54 extends radially outward away from the input axis 32 to a clutch portion 66, which engages the fixed portion 48 of the selectable one way clutch 46. A pilot 68 is disposed between the outer member 54 and the barrel portion 56 of the inner member 52. The pilot 68 radially supports the outer member 54 relative to the inner member 52, while allowing relative rotation between the outer member 54 and the inner member 52.

As noted above, the selectable one way clutch 46 includes the torque limiting system 40, which is operable to prevent torque transfer greater than a pre-defined value between the housing 28 and the input shaft 30. Accordingly, when torque is applied to the input shaft 30 that is less than the pre-defined torque value, then the torque limiting system 40 is operable to transfer the torque through the selectable one way clutch 46, between the housing 28 and the input shaft 30. However, if torque is applied to the input shaft 30 that is equal to or greater than the pre-defined torque value, then the torque limiting system 40 is operable to de-couple torque transfer through the selectable one way clutch 46, and prevent torque transfer between the housing 28 and the input shaft 30.

The torque limiting system 40 may include any system that is capable of limiting torque transfer between the housing 28 and the input shaft 30. For example, the torque limiting system 40 may include, but is not limited to a ball-detent torque limiting mechanism 70, such as shown in FIG. 2 or 4. While the torque limiting system 40 is shown in FIGS. 2 and 4 as a ball-detent torque limiting mechanism 70, it should be appreciated that the ball-detent torque limiting mechanism 70 is merely an exemplary embodiment. As such, the torque limiting system 40 may be configured in some other manner than the exemplary embodiment shown and described herein.

Figure 3:
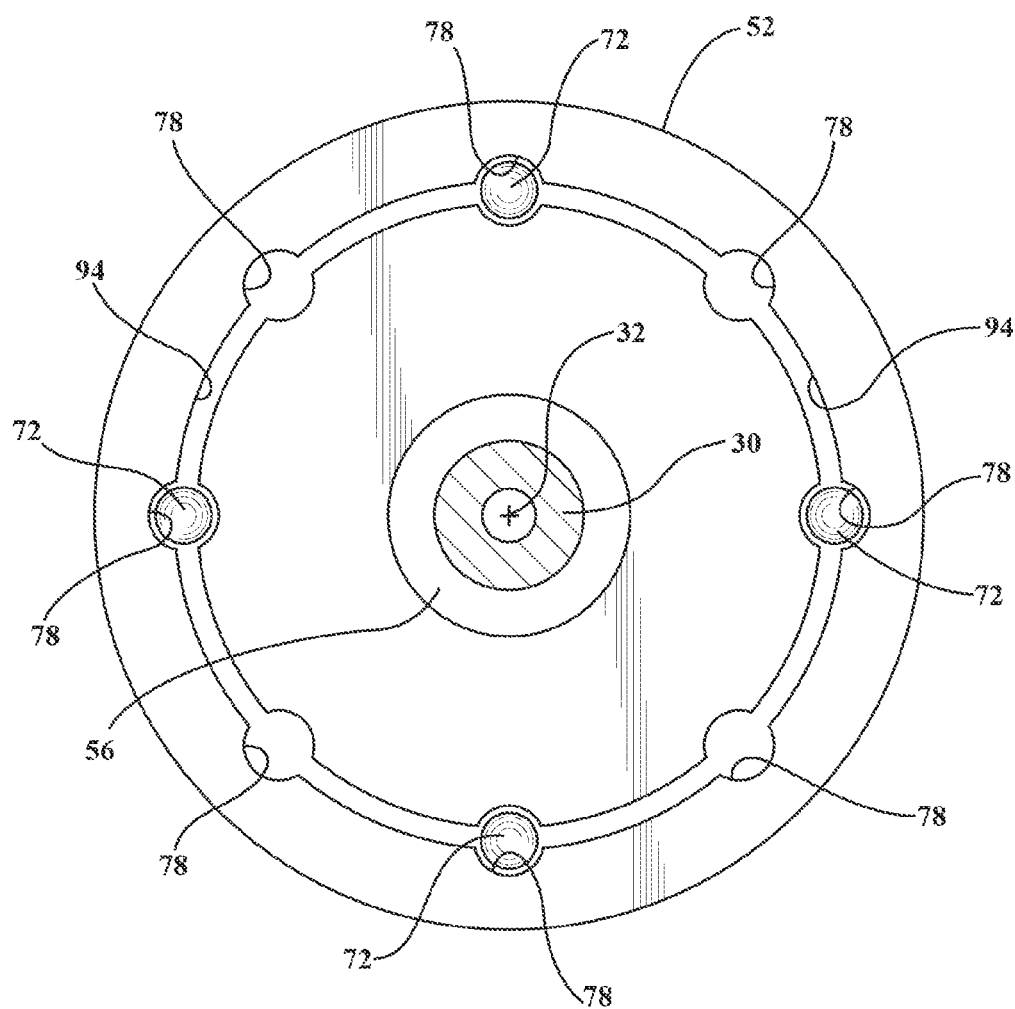
FIG. 3 is a schematic plan view of an inner member of the selectable one way clutch.

The ball-detent torque limiting mechanism 70 includes a ball 72 that is disposed within a pocket 74 defined by both the inner member 52 and the outer member 54. The pocket 74 includes a first portion 76 and a second portion 78. The first portion 76 of the pocket 74 is defined by and recessed into the annular plate portion 64 of the outer member 54. The second portion 78 of the pocket 74 is defined by and recessed into the annular plate portion 58 of the inner member 52. The first portion 76 and the second portion 78 are disposed opposite each other, such that the ball 72 may be partially disposed within each of the first portion 76 and the second portion 78 of the pocket 74. Referring to FIG. 3, the ball-detent torque limiting mechanism 70 preferably includes a plurality of balls 72, with each of the plurality of balls 72 disposed within one respective pocket 74. The cross section shown in FIG. 2 shows two balls 72, each disposed within a respective pocket 74. However, it should be appreciated that the ball-detent torque limiting mechanism 70 may include any number of balls 72, with each ball 72 disposed within one of the pockets 74, which are circumferentially spaced about the input axis 32. While the written description only describes a single ball 72 disposed within a respective pocket 74, it should be appreciated that the written description of the ball 72 and/or respective pockets 74 is applicable to a plurality of balls 72 and/or pockets 74 of the ball-detent torque limiting mechanism 70. Furthermore, as shown in FIG. 3, the inner member 52 may define more second portions 78 of the pockets 74 than the number of balls 72. The second portions 78 may be connected by an annular groove 94 extending circumferentially about the input axis 32.

Referring to FIGS. 2 and 4, the ball-detent torque limiting mechanism 70 further includes a spring 80, which is operable to bias the ball 72 against the inner member 52, in a first axial direction 82 along the input axis 32. As shown in FIGS. 1 and 2, the first portion 76 of the pocket 74 does not extend all the way through the annular plate portion 64 of the outer member 54, thereby forming a bottom surface to the first portion 76 of the pocket 74, against which the ball 72 rests and/or is contacted by the outer member 54. As such, the spring 80 biases against the outer member 54, which in turn biases the ball 72 against the inner member 52. However, Referring to FIG. 4, it should be appreciated that the first portion 76 of the pocket 74 may extend all the way through the annular plate portion 64 of the outer member 54, such that the spring 80 directly contacts and biases the ball 72 against the inner member 52.

The first portion 76 of the pocket 74 is formed so that the ball 72 is always retained within the first portion 76 of the pocket 74. In other words, the first portion 76 of the pocket 74 is formed such that the ball 72 may not be dislodged or unseated from the first portion 76 of the pocket 74. For example, the first portion 76 of the pocket 74 may be formed to include a depth that is greater than one half the diameter of the ball 72, such that the circumference of the ball 72 contacts a side surface of the first pocket 74, a distance recessed into the annular plate portion 64 of the outer member 54 relative to a radially extending surface of the outer member 54.

The second portion 78 of the pocket 74 includes an angled edge 84 forming an entrance/exit angle into the second portion 78 of the pocket 74. The angled edge 84 of the second portion 78 guides the ball 72 into and out of the second portion 78 of the pocket 74, and is disposed circumferentially about the second portion 78 of the pocket 74. The angled edge 84 may include for example, a chamfered annular edge, or a rounded annular edge having a radius.

Torque in the input shaft 30 generates a push-out force that acts against the ball 72 in a second axial direction 86 along the input axis 32. The second axial direction 86 is opposite the first axial direction 82. The axial push-out force operates to un-seat or dislodge the ball 72 from the second portion 78 of the pocket 74. The magnitude of the axial push-out force that is required to un-seat the ball 72 from the second portion 78 of the pocket 74 is dependent upon the magnitude of the entrance/exit angle, i.e., the relative angle formed between the angled edge 84 of the second pocket 74 and a radially extending wall surface of the annular plate portion 58 of the inner member 52. A higher value of the entrance/exit angle, i.e., an angle nearer 90°, increases the magnitude of the axial push-out force, whereas a lesser value of the entrance/exit angle, i.e., an angle nearer 0°, decreases the magnitude of the axial push-out force. It should be appreciated that an entrance/exit angle equal to 90° would provide no angled edge 84, and the second portion 78 of the pocket 74 would be disposed at 90° relative to the radially extending wall surface of the annular plate portion 58 of the inner member 52. Furthermore, it should be appreciated that an entrance/exit angle equal to 0° would provide a zero depth to the second portion 78 of the pocket 74. As such, the entrance/exit angle must be greater than 0°.

The spring 80 may include any suitable style and configuration of spring 80 cable of biasing the balls 72 against the inner member 52, and rotating with the input shaft 30 about the input axis 32. For example and as shown, the spring 80 may include, but is not limited to, a conical disc spring 80, sometimes referred to as a "Belleville Spring".

The spring 80 is attached to and rotatable with the input shaft 30. For example, a splined connection 88 may interconnect an inner radius of the spring 80 and the input shaft 30. As shown, the spring 80 includes a flat annular surface 90, which is disposed circumferentially adjacent a radial outer edge of the conical disc spring 80. The flat annular surface 90 is disposed against and biases the outer member 54 in the first axial direction 82. The flat annular surface 90 provides a surface to allow for relative slip between the spring 80 and the outer member 54, when the ball-detent torque limiting mechanism 70 is operating to decouple the outer member 54 from the inner member 52.

A fastener 92 is attached to the input shaft 30, and is operable to load the spring 80 along the input axis 32 in the first axial direction 82, to press the ball 72 against the inner member 52. As shown, the spring 80 biases against the outer member 54, which in turn biases the ball 72 against the inner member 52. However, as noted above, the spring 80 may directly contact the ball 72 and bias the ball 72 against the inner member 52. Preferably and as shown, the fastener 92 includes a nut disposed in threaded engagement with the input shaft 30. The fastener 92 may be torqued down to provide the required load to the rotatable portion 50 of the selectable one way clutch 46. As shown, the spring 80, when loaded by the fastener 92, is operable to compress the outer member 54 against and into abutting engagement with the ball 72, and thereby in turn compress the ball 72 against and into abutting engagement with the inner member 52. The inner member 52, in turn, contacts and engages the bearing 42, and presses the bearing 42 against the shoulder 44 of the input shaft 30. Accordingly, the nut loads not only the ball-detent torque limiting mechanism 70, but also loads the bearing 42.

Torque in the input shaft 30 generates the push-out force that acts against the ball 72 in the second axial direction 86. The ball 72 reacts against the spring 80, with the spring 80 biasing the ball 72 in the first axial direction 82. When the torque is greater than the pre-defined value, the push-out force becomes large enough move the ball 72 axially along the input axis 32, in the second axial direction 86, whereby the ball 72 becomes dislodged or unseated from the second portion 78 of the pocket 74. The magnitude of the push-out force required to un-seat the ball 72 from the second portion 78 of the pocket 74 is dependent upon not only the angled edge 84 of the second portion 78 of the pocket 74 as described above, but also on the strength, i.e., spring 80 constant of the spring 80, and the load applied to the spring 80 by the fastener 92. For example, a stiffer spring 80 with a higher pre-load, will require a higher axial push-out force to dislodge the ball 72 from the second portion 78 of the pocket 74. The spring 80 characteristic and the spring 80 pre-load, as well as and the angled edge 84 of the second portion 78 of the pocket 74, may be designed to achieve a desired axial push-out force, which may be correlated to a specific torque in the input shaft 30. Accordingly, the torque limiting system 40 may be designed to de-couple the selectable one way clutch 46 from the input shaft 30 at any desirable torque level.

Once the ball 72 is unseated from the second portion 78 of the pocket 74, the inner member 52 and the input shaft 30 are free to rotate relative to the outer member 54, the ball 72 supported by the outer member 54 in the first portion 76 of the pocket 74, and the spring 80, such that significantly less torque is transmitted between the outer member 54 and the inner member 52. The spring 80 continuously biases against the ball 72, in the first axial direction 82. As the inner member 52 rotates relative to the outer member 54, the second portion 78 of the pocket 74 occasionally comes back into contact with the ball 72 such that the biasing force from the spring 80 will bias the ball 72 back into the second portion 78 of the pocket 74. If the torque remains greater than the pre-defined value, than the process repeats, with the ball 72 once again becoming unseated. However, if the torque falls below the pre-defined value, the ball 72 will remain seated in the second portion 78 of the pocket 74 and re-establish normal operating torque transfer levels between the inner member 52 and the outer member 54.

Referring to FIG. 2, the outer member 54 moves axially along the input axis 32, relative to the inner member 52 and the fixed portion 48, as the ball 72 moves into and out of the pocket 74. However, referring to FIG. 4, the outer member 54 remains axially stationary along the input axis 32, relative to the inner member 52 and the fixed portion 48, as the ball 72 moves into and out the of pocket 74.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A transmission for a vehicle comprising:
a housing;
a shaft rotatably supported by the housing for rotation about an axis, and operable to receive a torque from an engine; and
a selectable one way clutch interconnecting the housing and the shaft, and selectively operable to prevent rotation of the shaft about the axes in at least one rotational direction;
wherein the selectable one way clutch includes:
a fixed portion attached to the housing, and a rotatable portion attached to the shaft;
wherein the rotatable portion includes an inner member mounted to the shaft and rotatably fixed to the shaft for rotation with the shaft about the axis, and an outer member rotatably supported by the inner member and rotatable about the axis relative to the shaft and the inner member; and
a torque limiting system operable to prevent torque transfer greater than a pre-defined value between the housing and the shaft.

2. A transmission as set forth in claim 1 wherein the torque limiting system includes a ball-detent torque limiting mechanism.

3. A transmission as set forth in claim 1 further comprising a pilot disposed between the outer member and the inner member, and radially supporting the outer member relative to the inner member.

4. A transmission as set forth in claim 1 wherein the torque limiting system includes a ball disposed within a pocket defined by both the inner member and the outer member, and a spring operable to bias the ball against the inner member.

5. A transmission as set forth in claim 4 wherein the spring includes a conical disc spring.

6. A transmission as set forth in claim 5 wherein the spring includes a flat annular surface disposed circumferentially adjacent a radial outer edge of the conical disc spring.

7. A transmission as set forth in claim 6 wherein the spring is attached to and rotatable with the shaft.

8. A transmission as set forth in claim 4 further comprising a fastener attached to the shaft and operable to load the spring along the axes, to press the ball against the inner member.

9. A transmission as set forth in claim 8 wherein the fastener includes a nut disposed in threaded engagement with the shaft.

10. A transmission as set forth in claim 4 wherein the pocket includes a first portion defined by and recessed into the outer member, and a second portion defined by and recessed into the inner member.

11. A transmission as set forth in claim 10 wherein the second portion of the pocket includes an angled edge forming an entrance/exit angle into the second portion of the pocket for guiding the ball into and out of the second portion of the pocket, wherein an axial push-out force required to un-seat the ball from the second portion of the pocket is dependent upon the magnitude of the entrance/exit angle.

12. A transmission as set forth in claim 1 wherein the shaft includes one of an input shaft, an intermediate shaft, or an output shaft.

* * * * *